United States Patent
Lindkvist

(10) Patent No.: US 7,425,020 B2
(45) Date of Patent: Sep. 16, 2008

(54) STEERING WHEEL SUSPENSION SYSTEM

(76) Inventor: Mats Lindkvist, Arrendegatan 18, 462 41 Vanersborg (SE)

( * ) Notice: Subject to any disclaimer, the term of this patent is extended or adjusted under 35 U.S.C. 154(b) by 1 day.

(21) Appl. No.: 11/681,835

(22) Filed: Mar. 5, 2007

(65) Prior Publication Data
US 2007/0246926 A1 Oct. 25, 2007

(30) Foreign Application Priority Data
Apr. 25, 2006 (SE) .................................. 0600895

(51) Int. Cl.
B62D 1/00 (2006.01)

(52) U.S. Cl. .................. 280/777; 280/750; 280/751; 280/752

(58) Field of Classification Search .......... 280/748, 280/750, 751, 752, 777, 779
See application file for complete search history.

(56) References Cited

U.S. PATENT DOCUMENTS

| | | | | |
|---|---|---|---|---|
| 4,949,990 A * | 8/1990 | Hirahara et al. | ............ | 280/750 |
| 5,476,283 A * | 12/1995 | Elton | ............ | 280/753 |
| 5,496,066 A * | 3/1996 | Hoffmann et al. | ............ | 280/753 |
| 6,382,670 B2 * | 5/2002 | Badaire et al. | ............ | 280/777 |
| 6,491,322 B1 * | 12/2002 | Ryner | ............ | 280/751 |
| 6,962,367 B2 * | 11/2005 | Muller | ............ | 280/750 |
| 7,052,043 B2 * | 5/2006 | Lee | ............ | 280/775 |
| 7,063,354 B2 * | 6/2006 | Riefe et al. | ............ | 280/777 |
| 7,128,342 B2 * | 10/2006 | Davis et al. | ............ | 280/777 |
| 7,185,918 B2 * | 3/2007 | Riefe et al. | ............ | 280/777 |

* cited by examiner

*Primary Examiner*—Toan To
(74) *Attorney, Agent, or Firm*—Rolf Fasth; Fasth Law Offices

(57) ABSTRACT

The present invention refers to a steering wheel suspension system to reduce the risk of injury to the driver in connection with a vehicle collision, wherein the system includes a steering wheel axle (1), a steering wheel shaft (3) in which the steering wheel axle (1) is rotatably carried, a steering wheel (7) arranged at one end of the steering wheel axle (1) and a knee bar (20). Characteristic features of the steering wheel suspension system according to the present invention is a box construction (5) that is fixedly attached to the steering wheel shaft (3), that a console (9) carries the box construction (5), that the box construction (5) is shiftable relative to the console (9) in a length direction (L) of the steering wheel suspension system, that the box construction has a carrying member (30), that the knee bar (20) is swingably suspended in the console (9), and that the knee bar include an arm portion (22, 26, 27) that affect the carrying member (30) when the knee bar (20) is brought into a swinging motion in connection with a collision.

9 Claims, 5 Drawing Sheets

STEERING WHEEL SUSPENSION SYSTEM

PRIOR APPLICATION

This is a U.S. patent application that claims priority from Swedish patent application No. 0600895-7, filed 25 Apr. 2005.

TECHNICAL FIELD

The present invention relates to a steering wheel suspension system for reducing the risk of injury to the driver in connection with vehicle collisions. The system includes a steering wheel axle, steering wheel shaft in which the steering wheel axle is rotatably carried. The system includes a steering wheel and a knee bar at one end of the steering wheel axle.

PRIOR ART

U.S. Pat. No. 6,220,630 shows a steering wheel suspension system in which the steering wheel axle is carried in a holder device that preferably is arranged under the instrument panel of a vehicle. The steering wheel suspension system includes two electric motors to adjust the position of the steering wheel axle so that both the depth and height adjustments can be done. The electric motors rotate in the cogwheel of the steering wheel suspension system that cooperates with cog bars to accomplish the necessary shifting in connection with the adjustment of the position of the steering wheel axle.

The steering wheel suspension system according to U.S. Pat. No. 6,220,630 also includes members to reduce the risk for injuries to the driver. The members include a swingable suspended knee bar that the knees of the driver push forwardly during a collision. The knee bar is connected to the housings of the electric motors via an energy-absorbing link. The housings of the electric motors carry out a rotational movement once a certain predetermined force is achieved and security members, such as breakable pins, are released.

When the housings of the electric motors perform the rotational movement this movement is transferred via the cogwheels and the cog bars to an axial movement of the steering wheel axle that is turned towards the driver.

OBJECTS AND FEATURES OF THE INVENTION

One primary object of the present invention is to develop a steering wheel suspension system as defined in the introduction above so that the design of steering wheel suspension system is very simple while being fully functional.

Another object of the present invention is that the shifting of the knee bar that is included in the steering wheel suspension system is directly transferred to a shifting of the steering wheel axle.

At least the primary feature of the present invention is realized by a steering wheel suspension system that is described in the appended independent patent claims. Preferred embodiments of the invention are defined in the dependent patent claims.

BRIEF DESCRIPTION OF THE DRAWINGS

Below is description a preferred embodiment of the invention that refers to the appended drawings wherein.

DETAILED DESCRIPTION OF A PREFERRED EMBODIMENT OF THE INVENTION

Figure 1:
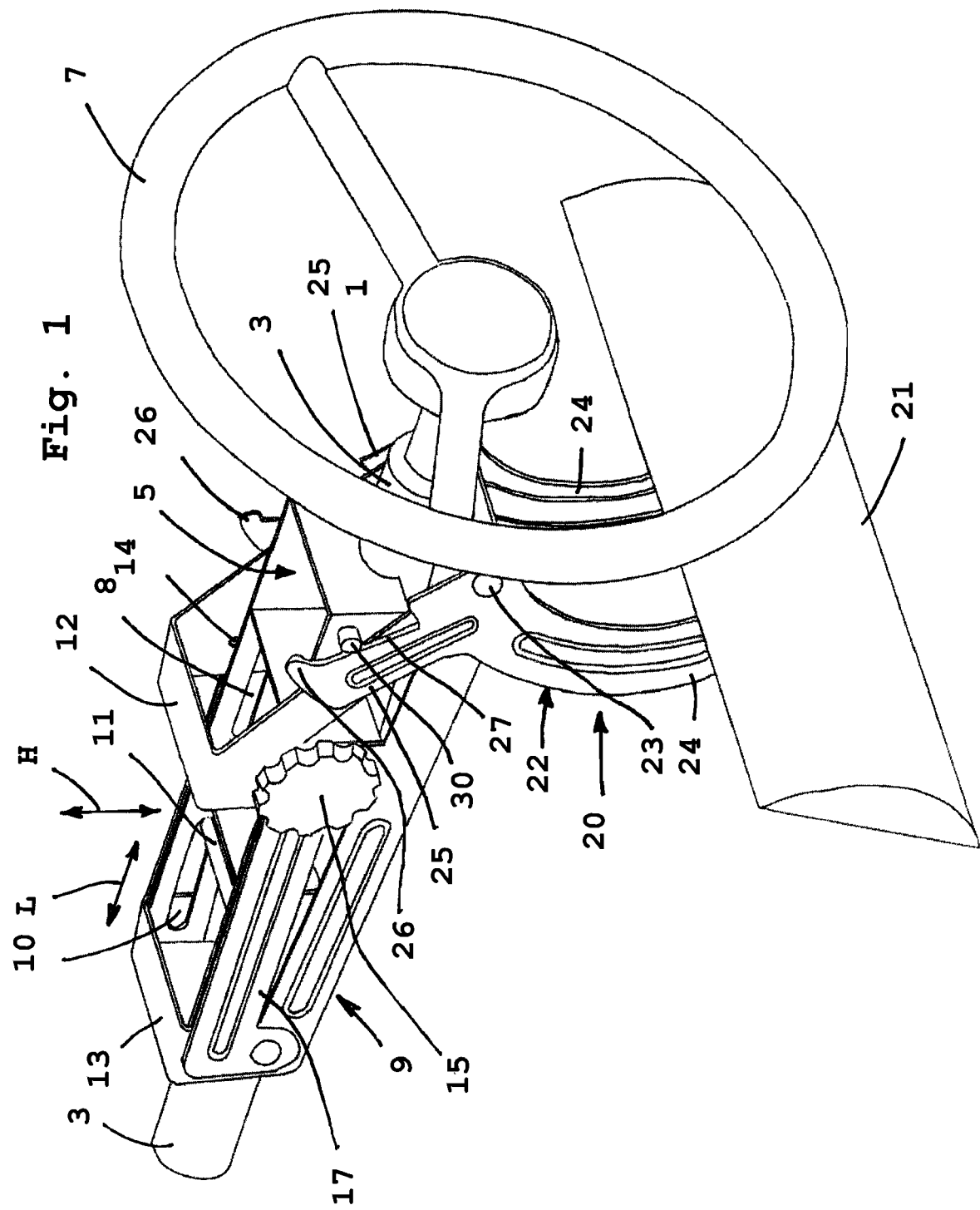
FIG. 1 shows a perspective view of a steering wheel suspension system wherein the steering wheel is positioned in a certain position.

The steering wheel suspension system according to the present invention has a length direction, which in FIG. 1, is defined by the double arrow L and a height direction, which in FIG. 1, is defined by the double arrow H. The steering wheel suspension system according to the present invention includes the steering wheel axle 1 which is carried in a steering wheel shaft 3 that includes a sleeve. The steering wheel axle 1 is rotatably mounted relative to the steering wheel shaft 3 that is fixed, such as welded, in a box construction 5. At one end of the steering wheel axle a steering wheel 7 is arranged.

The box construction 5 is connected to a console 9 that extends in the length direction of the steering wheel shaft 3. The box construction 5 has first and second slits 8, 10, respectively that extend in the length direction L of the steering wheel suspension system. The console 9 has a first attachment 12 and a second attachment 13 so that the attachments are plane surfaces in the preferred embodiment. The console 9 is attached, via the attachments 12, 13 in a suitable way to the chassis of the vehicle so that the console is positioned below the instrument panel.

In connection with the first attachment 12 in the console 9 there are three slits 14 of which only one is partly shown in FIG. 1. A second slit is hidden by a rotatably know 15 that is mounted on a second shaft 16, see FIG. 2, that extends through both the first slits 8 and the third slits 14. The slits 14 generally extend in the height direction H of the steering wheel suspension system. The arrangement of the bars 11, 16 and the slits 8, 10, 14 make it possible to shift the box construction 5 relative to the console 9 in the length direction L of the steering wheel suspension system.

The second bar 16 also extends through a first arm 17 in the area of one end of the first arm 17. The second end of the first arm 17 is rotatably attached to the console 9 in the area of the console that is located further away from the steering wheel 7. There is a corresponding first arm on the side of the console 9 that is hidden in the figures. The rotatable knob 15 and the second bar 15 are also provided with some sort of nut arrangement that is situated on the side of the console that is hidden in the figures. The rotatable knob 15, the bar 16 and the nut arrangement cooperate in such a way that the when the rotatable know is rotated in a certain direction the console is clamped around the box construction 5 so that a friction coupling is generated between the console 9 and the box construction 5. When the rotatable know 15 rotates in the opposite direction the friction coupling is terminated between the console 9 and the box construction 5.

In the area of the end of the console 9 that is turned toward the steering wheel 7 the steering wheel suspension system according to the present invention includes a knee bar 20 that includes a pillow 21 and an activation member 22 that supports the pillow 21. The activation member is in the form of an arm unit that via a link 23 is rotatably attached to the console 9. The link 23 is a stationary point because it is arranged in the stationary console 9.

The arm unit 22 includes two first arm portions 24 that extend between the pillow 21 and the link 23 and two second arm portions 25 that extend from the link 23 and each terminating with free ends. In the area of the free end of each of the second arm portions 25 the arm unit 22 is shaped with a nose 26 which function is described below. The arm unit 22 thus includes two noses 26. Inside the noses 26 each of the second arm portions 25 includes with a stop surface 27 which function is described below.

The box construction 5 is in the area of the end that is turned towards the steering wheel 7 provided with two protrusions 30 of which only one is shown in the figures. The protrusions are adapted to cooperate with the arm unit 22 and more particularly with the noses 26 of the arm unit 22.

Figure 2:
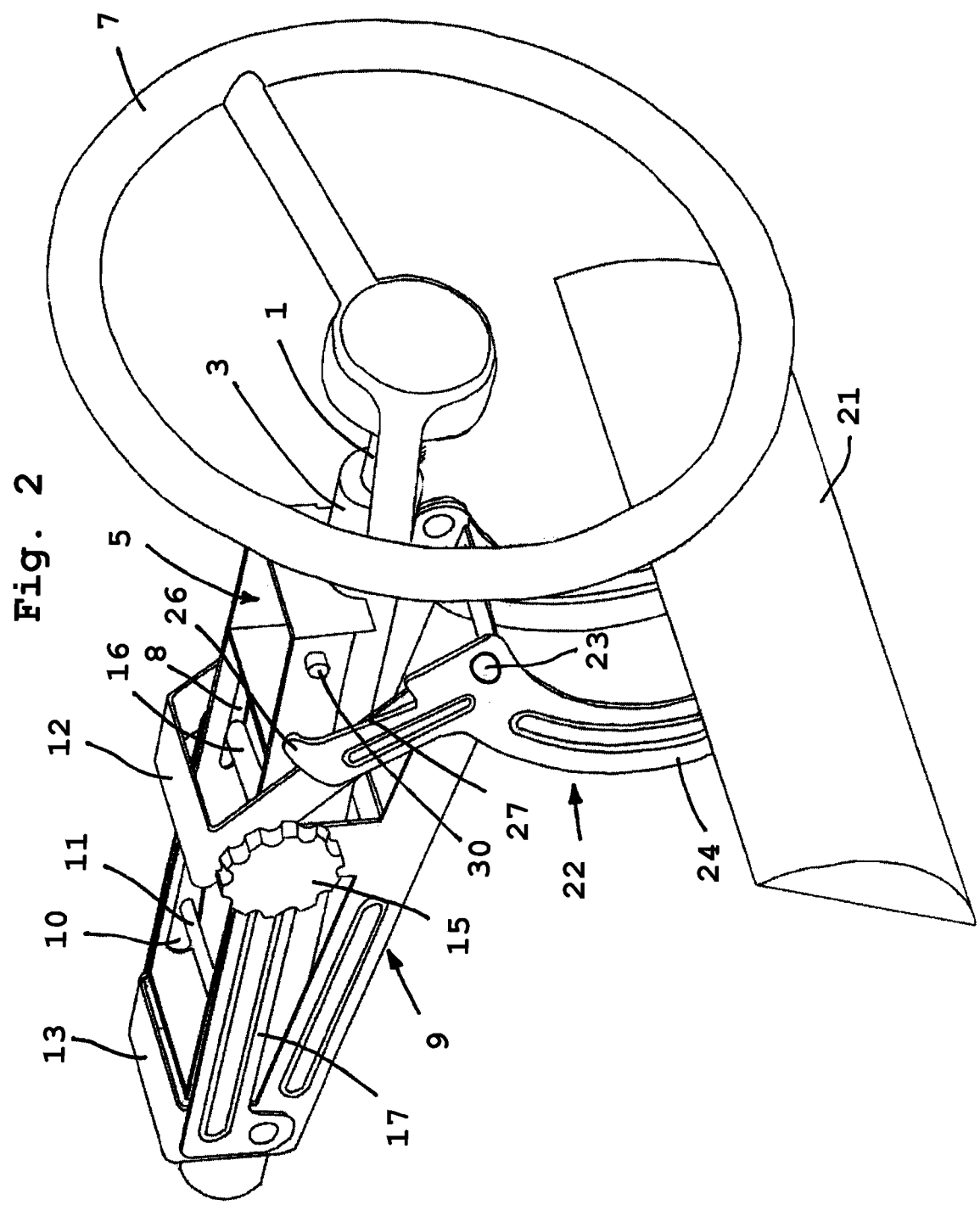
FIG. 2 shows a perspective view of the steering wheel suspension system according to FIG. 1 wherein the steering wheel is in a different position compared to FIG. 1.

FIGS. 1 and 2 illustrate how the steering wheel suspension system according to the present invention can be adjusted regarding the position of the steering wheel axle 1/steering wheel 7. FIG. 1 shows a neutral position for the steering wheel axle 1/steering wheel 7 of the steering wheel suspension system according to the present invention while FIG. 2 shows a position for the steering wheel axle/steering wheel 7 where the steering wheel axle 1 is shifted towards the driver and raised compared to the position according to FIG. 1. To adjust the position of the steering wheel axle 1/steering wheel 7 from the position shown in FIG. 1 to the position shown in FIG. 2, the friction coupling between the console 9 and the box construction 5 is released by rotating the knob 15. The box construction 5 can now be shifted in the direction towards the knee bar 20. This is made possible by the slits 8, 10 of the box construction 5 that are shifted relative to the bars 11 and 16. To raise the steering wheel axle 1/steering wheel 7, the bar 16 is brought to be shifted in the third slits 14. When the desired position of the steering wheel axle 1/steering wheel 7 has been achieved, that is the position according to FIG. 2, the friction couplings are activated between the console 9 and the box construction 5 by rotating the knob 15.

Figure 3:
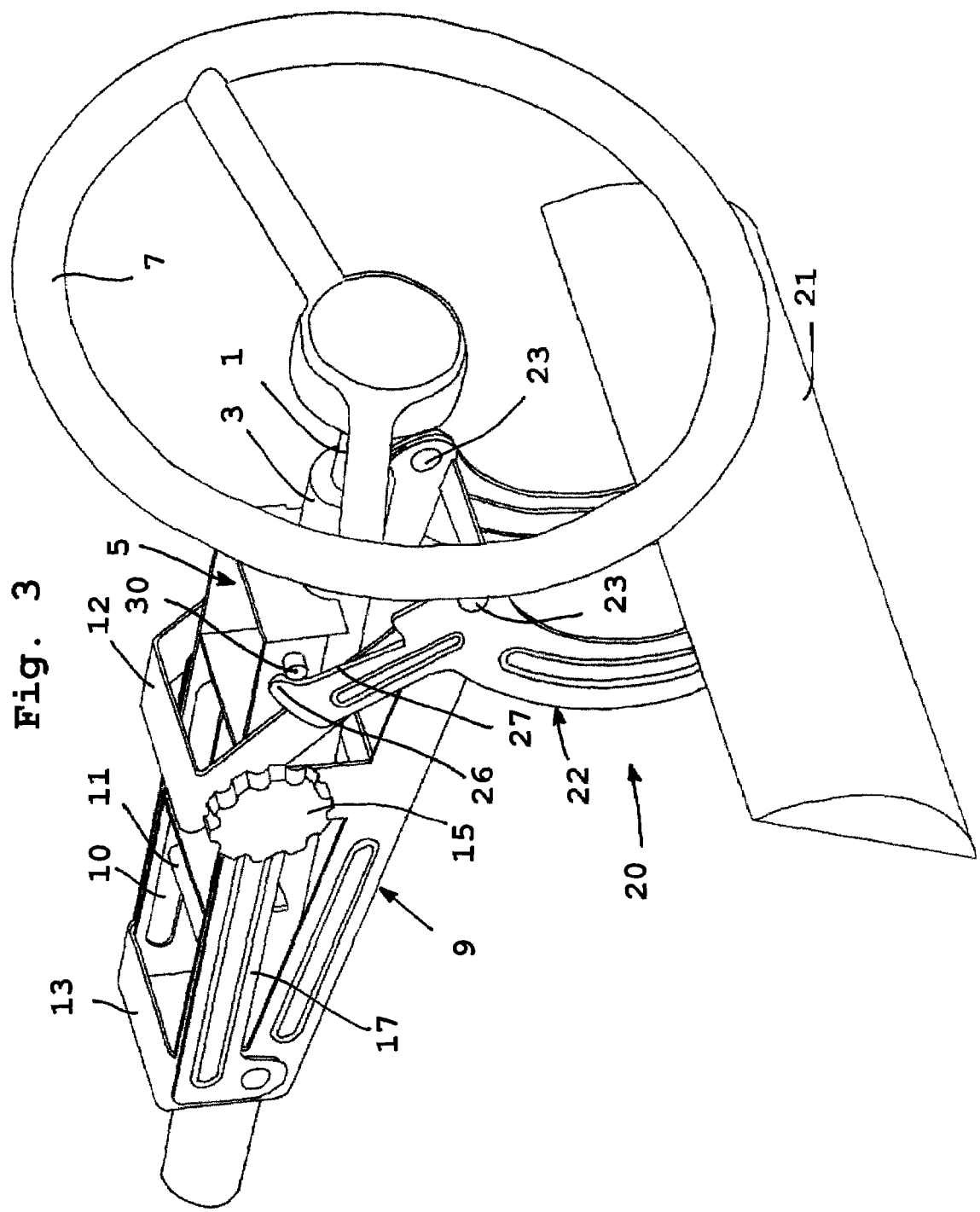
FIG. 3 shows a perspective view of the steering wheel suspension system according to the present invention wherein the knee bar is in an initial position.
Figure 4:
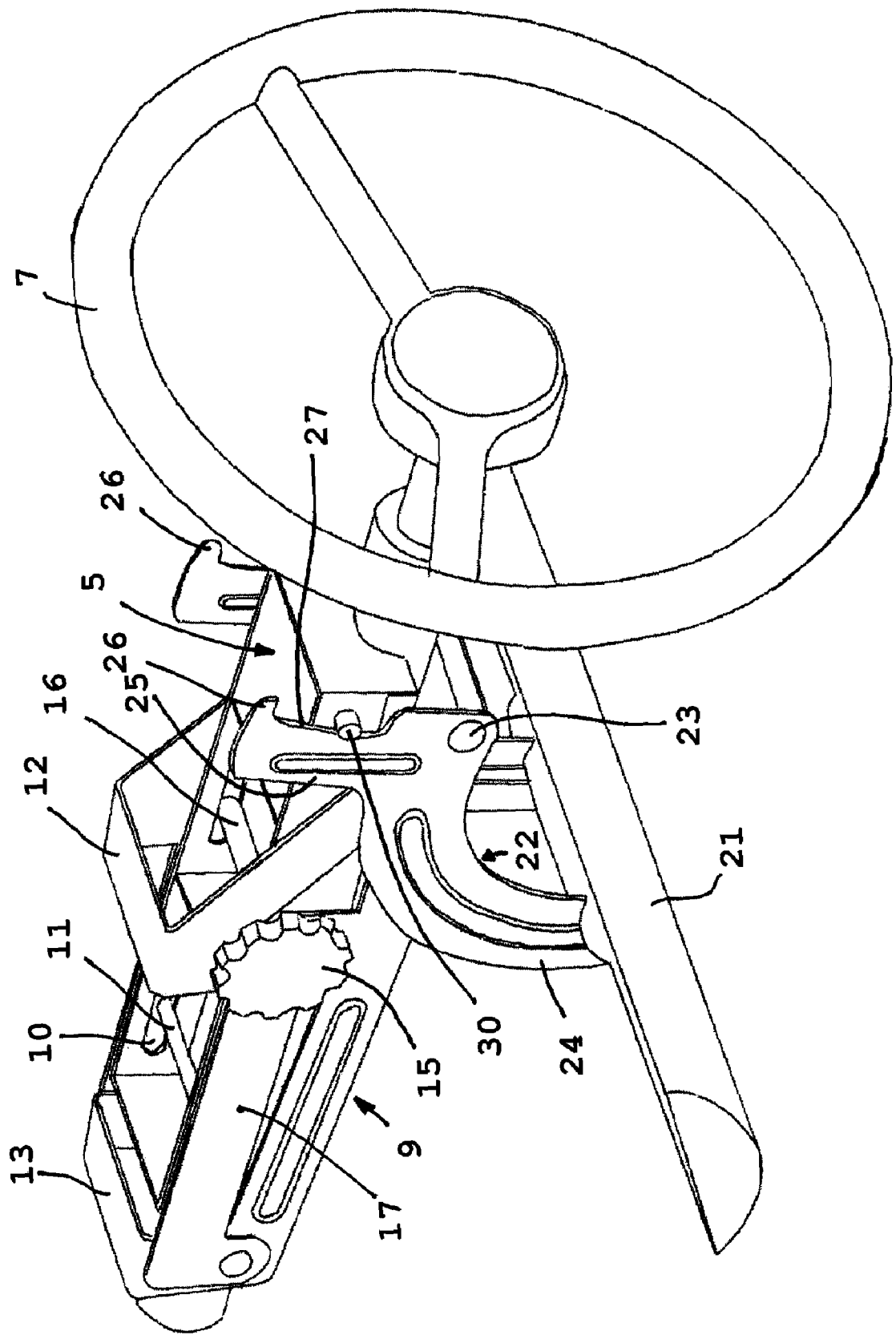
FIG. 4 shows a perspective view of the steering wheel suspension system according to the present invention wherein the knee bar is in a forwardly shifted position.
Figure 5:
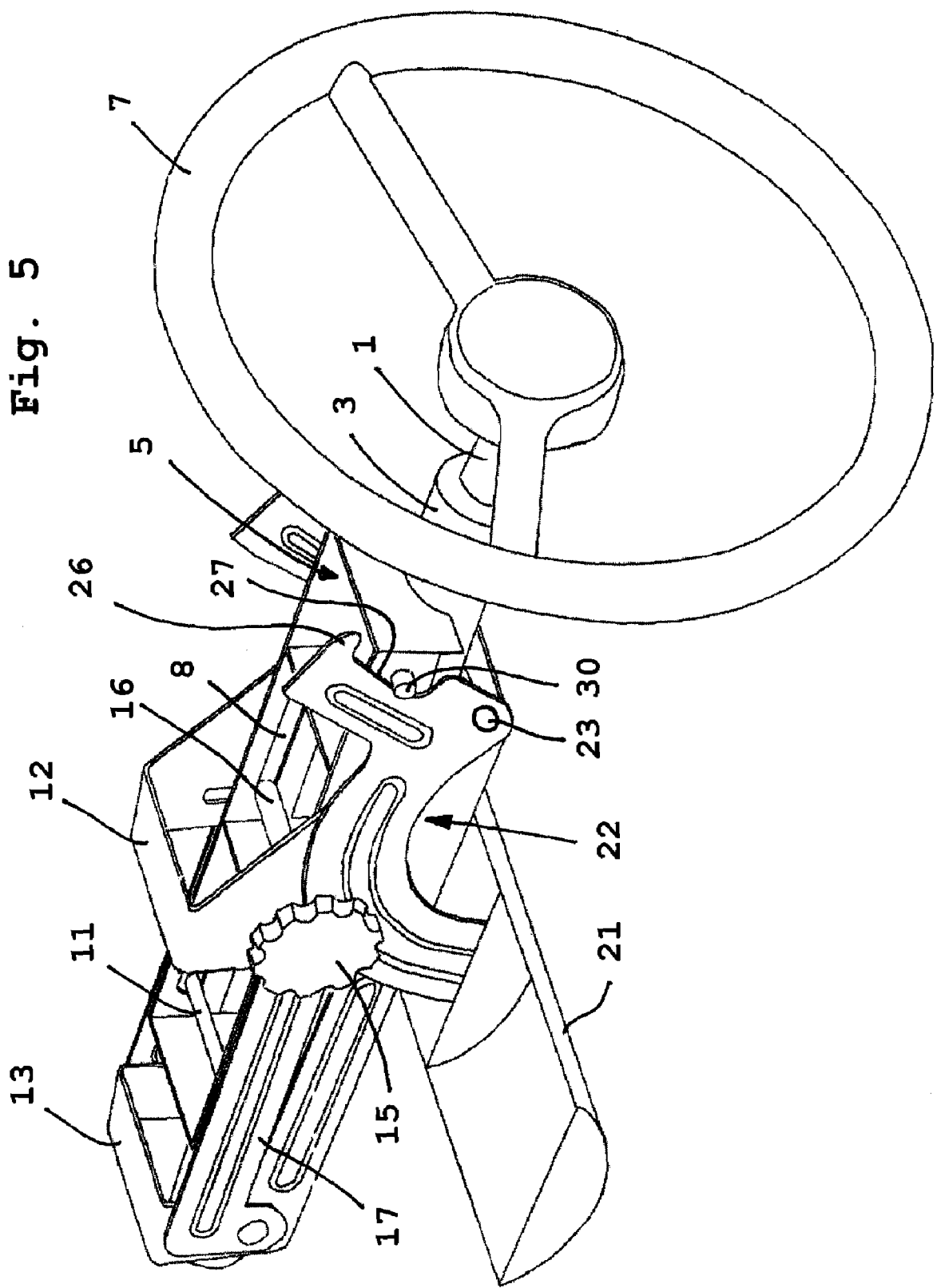
FIG. 5 shows a perspective view of the steering wheel suspension system according to the present invention wherein the knee bar is in a further forwardly shifted position.

The primary function of the steering wheel suspension system according to the present invention is to reduce the risk for injuries to the driver in connection with a vehicle collision. To achieve this function, the steering wheel suspension system of the present invention has a knee bar 20. FIGS. 3-5 illustrate the function of the knee bar 20.

FIG. 3 shows the steering wheel suspension system according to the present invention with the knee bar 20 in a starting position. It should be noted that the noses 26 (only one is shown) of the arm unit 22 are in contact with the corresponding protrusions 50 (only one is shown) of the box construction 5.

The following scenario is played out during a collision. When a vehicle is slowed down due to the collision the driver's body is moved forwardly in the vehicle as a result of the laws of inertia. The knees of the driver thus come into contact with the pillow 21 of the knee bar 20 so that the driver's forward movement in the vehicles results in that the pillow 21 is moved forwardly in the vehicle, that is from the first moment shown in FIG. 3 to the position shown in FIG. 4. During the movement of the pillow 21 from the position according to FIG. 3 to the position according to FIG. 4 the noses 26 and the associated surfaces 21 will affect the protrusions 30 so that the protrusions 30 are shifted in the length direction L of the steering wheel suspension system towards the link 23. Thus the protrusions are shifted relative to its associated stop surface 27 so that the shifting is done in the direction away from the corresponding nose 26. The above-described shifting of the protrusions 20 also results in that the box construction, including the steering wheel axle 1 and the steering wheel shaft 3 are shifted in the same direction.

FIG. 5 shows that there is an additional forward shifting of the pillow 21 of the knee bar 20 that is from the position shown in FIG. 4 to the position shown in FIG. 5. This shifting also occurs because the driver moves forwardly during the collision and that the knees of the driver also are shifted forwardly and cause the shifting of the pillow 21 from the position shown in FIG. 4 to the position shown in FIG. 5.

During the shifting from the position shown in FIG. 4 to the position shown in FIG. 5 there is an additional rotation of the arm unit 22 around the link 23 that results in that the stop surfaces 27 add forces to the associated protrusions 30. As is best shown in FIG. 5, the stop surfaces 27 will not only add the force to the associated protrusion 30 in the length direction of the steering wheel suspension system but also a downwardly directed force in the height direction H of the steering wheel suspension system. This downward force results in that the box construction 5, including the steering wheel axle 1, the steering wheel shaft 3 and the steering wheel 7, are moved downwardly at the end that is turned towards the driver. This downward movement during the end phase of the shifting of the steering wheel axle 1, the steering wheel shaft 3 and the steering wheel 7 has scientifically been shown to be important to further reduce the risk of injury to the driver that may occur during a collision.

During the above described shifting of the box construction 5 including the steering wheel axle 1, the steering-wheel shaft 3 and the steering wheel 7 that are generated by the shifting of the knee bar 20 the friction coupling between the console 9 and the box construction 5 is exceeded.

POSSIBLE MODIFICATIONS OF THE INVENTION

To further reduce the risk of injuries to the driver during a collision, the steering wheel axle may be provided with or connected to an energy-absorbing member i.e. when the upper body of the driver comes into contact with the steering wheel 7, the steering wheel and the steering wheel axle 1 will move forwardly when the driver exerts a certain force onto the steering wheel 7.

When using the above-described embodiment the steering wheel suspension system of the present invention has a member for adjusting the steering wheel axle 1/steering wheel 7 in the axial direction and in the height direction. Within the scope of the present invention it is possible to omit such adjustment members of the steering wheel suspension system.

The above described steering wheel suspension system includes a pillow 21 that the knees of the driver come into contact with during a collision. Within the scope of the present invention it is possible to integrate an inflatable collision pillow into the pillow 21. This means that the inflatable collision pillow encounters the knees of the driver at an earlier stage.

The stop surfaces 27 shown in the figures according to the above-described embodiment of steering wheel suspension system of the present invention are substantially plane. Within the scope of the present invention it is though possible that a different shaped of the stop surfaces could be used. For instance, as a non-limiting example concave stop surfaces could be mentioned. By varying the shape of these stop surfaces the movement of the steering-wheel axle 1/steering-wheel shaft 3 may be affected in a more active way i.e. if the axial movement is to occur first and thereafter the downward direction or if the axial and the downward movement are to occur simultaneously.

The invention claimed is:

1. Steering wheel suspension system to reduce the risk for injuries to a driver in connection with a vehicle collision wherein the system includes a steering wheel axle (1), a steering wheel shaft (3) into which the steering wheel axle (1) is rotatably supported, a steering wheel (7) arranged at one end of the steering wheel axle (1) and a knee bar (20) characterized therein that a box construction (5) is fixedly attached to the steering wheel shaft (3), a console (9) supporting the box construction (5), that the box construction (5) is shiftable relative to the console (9) in a length direction (L) of the steering wheel suspension system, that the box construction (5) has a carrier member (30), that the knee bar (20) is rotatably suspended in the console (9), and that the knee bar (20) include an arm portion (22, 26, 27) that affects the carrier member (30) when the knee bar (20) is put into swinging motion in connection with a collision.

2. Steering wheel suspension system, according to claim 1, characterized therein that the knee bar (20) include an arm unit (22) which via a link (23) is swingably suspended in the console (9).

3. Steering wheel suspension system, according to claim 1, characterized therein that the knee bar (20) includes a pillow (21).

4. Steering wheel suspension system, according to claim 1, characterized therein that there is a friction coupling formed between the box construction (5) and the console (9).

5. Steering wheel suspension system, according to claim 1, characterized therein that the carrier member include protrusions (30) on the box construction that cooperate with stop surfaces (27) on the arm portions (27).

6. Steering wheel suspension system, according to claim 1, characterized therein that the steering wheel axle (1) is connected to an energy absorbing member.

7. Steering wheel suspension system, according to claim 1, characterized therein that the box construction (5) has grooves (8, 10, 14) defined therein and that a relative position of the box construction (5) and the console (9) is adjustable in a length direction (L) and a height direction (H) by an arrangement of the grooves (8, 10, 14) and bars (11, 16).

8. Steering wheel suspension system, according to claim 7, characterized therein that the bars (11, 16) are in operative engagement with the console (9).

9. Steering wheel suspension system, according to claim 1 characterized therein that an energy absorbing device (136) is connected to the arm portion (22), the energy-storing device (136) being fastened to a stationary part of the steering wheel suspension system.

* * * * *